US 8,869,688 B2

(12) United States Patent
Brüning

(10) Patent No.: US 8,869,688 B2
(45) Date of Patent: Oct. 28, 2014

(54) BALER

(75) Inventor: Heiner Brüning, Suddendorf (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 256 days.

(21) Appl. No.: 13/184,495

(22) Filed: Jul. 16, 2011

(65) Prior Publication Data

US 2012/0012012 A1   Jan. 19, 2012

(30) Foreign Application Priority Data

Jul. 16, 2010   (DE) .......................... 10 2010 027 539

(51) Int. Cl.
| | |
|---|---|
| *A01F 15/14* | (2006.01) |
| *B65B 13/18* | (2006.01) |
| *A01F 15/12* | (2006.01) |
| *A01F 15/08* | (2006.01) |
| *A01F 21/00* | (2006.01) |

(52) U.S. Cl.
CPC ................. *A01F 15/12* (2013.01); *A01F 15/08* (2013.01); *A01F 21/00* (2013.01); *Y10S 100/912* (2013.01)
USPC .................... 100/8; 100/34; 100/912; 56/341

(58) Field of Classification Search
USPC .................. 100/3, 8, 34, 88, 89, 912; 56/341; 53/118, 176, 211, 389.2, 587
See application file for complete search history.

(56) References Cited

U.S. PATENT DOCUMENTS

| | | | | |
|---|---|---|---|---|
| 1,731,347 | A | * | 10/1929 | Milosewicz ............... 242/137.1 |
| 5,996,307 | A | | 12/1999 | Niemerg et al. |
| 6,272,816 | B1 | * | 8/2001 | Viaud et al. ..................... 53/587 |
| 2003/0226334 | A1 | * | 12/2003 | McClure et al. ................ 53/176 |
| 2006/0237140 | A1 | | 10/2006 | Chapon et al. |
| 2010/0236427 | A1 | * | 9/2010 | Derscheid .......................... 100/5 |

FOREIGN PATENT DOCUMENTS

EP   1602269 B1   12/2005

* cited by examiner

*Primary Examiner* — Jimmy T Nguyen
(74) *Attorney, Agent, or Firm* — Gudrun E. Huckett

(57) ABSTRACT

A baler is supported by wheels on the ground and is either self-propelled or hitched to and driven by a tractor. The baler has pickup and conveying devices for collecting and transporting the harvested goods to a pressing channel where bales are formed. The bales are tied by tying material supplied from a storage container arranged on the baler and moveable from an operating position into a servicing position allowing access to machine components of the baler covered by the storage container in the operating position. The storage container is moveable into a loading position for inserting or removing rolls of the tying material. The loading position and the servicing position are identical. In the loading and servicing position the storage container has, in comparison to the operating position, a greater spacing relative to a longitudinal center plane of the baler and a reduced spacing relative to the ground.

13 Claims, 2 Drawing Sheets

BALER

BACKGROUND OF THE INVENTION

The invention relates to a baler, in particular for producing bales of agricultural harvested goods. The baler is embodied as a harvesting machine that is supported on wheels, is either self-propelled or hitched and driven by a tractor. The baler collects the harvested goods by means of collecting/pickup and conveying devices and supplies the collected harvested goods to a pressing device that forms the harvested goods into bales. In order to keep their shape permanently, the bales are tied by tying or binding material that is supplied to the bale from a storage container arranged on the baler and storing the tying material rolls. The storage container for the tying material rolls is pivotable from an operating position into a servicing position in order to allow access to machine parts that are covered in the operating position by the storage container.

Such balers are known in various configurations, sizes and drive variants. However, only square or round balers that are attachable to a tractor vehicle and driven by the tractor have achieved market recognition almost exclusively. The square balers have a pressing piston that is arranged to be reciprocatingly movable within a pressing or compression channel; its movements compress the harvested goods introduced into the compression channel and shape the harvested goods to a square bale. In order to secure the shape of the compressed bale, the bales are tied with a tying twine, yarn or cord or a similar tying material. For this purpose, a tying device is correlated with the compression channel; the tying or knotting device—preferred are double tying devices—during the pressing process supplies by means of tying needles an upper and a lower twine that at the beginning and the end of the respective bale must be knotted together, respectively. The tying twine is unwound from the twine storage roll; the rolls usually are supported in storage containers that are laterally mounted on the frame of the baler. The number as well as the arrangement of the tying twine rolls in the storage containers can vary greatly. Mostly, however, at least 24 tying twine rolls, including reserve rolls, are stored upright in the storage containers in compartments arranged on top of each other and adjacent to each other.

Since the demands on balers are changing constantly and higher compression densities by simultaneously increased throughput are to be always achieved, it is necessary to adapt the quantity and the strength of the tying twine or yarn with which the bales are to be held together to these demands. Accordingly, a daily supply in the storage containers requires a greater number of tying yarn rolls to be carried on the baler; this results in the storage containers becoming increasingly larger with respect to their configuration and thus less accessible to the user. Also it becomes more difficult to have access to the machine components that are positioned behind the storage containers in order to be able to perform servicing work.

The prior art discloses embodiments of balers in which one-part or two-part storage containers are arranged such that they are laterally foldable. In this way, the machine components that are positioned behind the storage containers are made accessible and servicing is made easier, but the accessibility of the storage containers themselves is not improved. Since the storage containers are only pivoted or swivelled to the side, the accessibility of the storage compartments for the tying yarn rolls is not improved. The height of the storage containers relative to the ground surface remains unchanged so that refilling or removal of material rolls into and from the containers is still a complex task. Moreover, the user when supplying the baler with tying yarn material is always impaired by the large size tires of the machine so that the upper compartments of the containers are hardly accessible without auxiliary means or labor procedures prone to cause an accident.

SUMMARY OF THE INVENTION

It is therefore an object of the present invention to provide a baler of the aforementioned kind which provides improved accessibility of the machine units arranged behind the storage containers as well as in particular of the storage containers themselves in order to improve ease of servicing and operation and in order to prevent accidents.

This object is solved according to the invention in that the at least one storage container for the tying material rolls can be moved into a loading position that is at the same time the servicing position, wherein, at least mostly, its spacing to the vertical longitudinal center plane of the baler is enlarged and at the same time its spacing to the ground surface is reduced.

Further embodiments are disclosed in the dependent claims.

According to the present invention, a baler is provided that has a storage container for tying yarn or winding material which, in a preferred embodiment, can be moved into a loading position that is approximately parallel to the machine frame of the baler and that is at the same time the servicing position; in this way, in particular an improved access to the storage container itself and also to the machine components that, in the operating position, are covered by or hidden behind these storage container is enabled.

In a square baler of the aforementioned kind with a double knotting system, the pressing channel has a tying device associated therewith that supplies to the bale during the compression process upper and lower yarn strands. The lower yarns are supplied by means of needles via a tensioning system; the yarns are applied about the bottom and the two end faces of the bale. The upper yarns are supplied directly through a tensioning system to the bale and stretch across the top side of the bale. The tying yarn is unwound from tying yarn storage rolls, preferably stored in two storage containers that in the travel direction are arranged to the left and to the right of the baler. Also conceivable is to arrange the storage containers at another location of the baler but this is disadvantageous because of the lack of space and the unfavorable guiding action of the yarn to the knotters.

In an embodiment according to the invention it is provided that the storage container or storage containers are moved by a pivot movement into a lowered loading position external to the projection area of the wheels so that the user has improved access to the storage container itself and to the machine components that are positioned behind the storage container. This movement can be performed preferably in a single curved path movement (continuous path movement) but can also be realized in several pivot and/or linear movements that are independent of each other so that the user can choose between a servicing position that is at least approximately parallel to the main frame of the baler or a lowered loading position requiring further movement. Moreover, it is conceivable that the storage container in another embodiment is pivoted to the side about a vertical axis that is arranged on the frame of the baler and is subsequently lowered in downward direction. The movement of the storage container is realized, independent of the number of movements, preferably by an actuator that, for example, is a hydraulic, electric or pneumatic one. A hydraulic embodiment, inter alia as a result of the minimal space requirement and the already existing hydraulic system of the baler, is one of the most advantageous solutions.

Moreover, it is conceivable to move the storage container by means of muscle power, supported by the force of a power storage device, for example, springs and/or compensation weights.

In order for the tying yarn upon movement of the storage container not to be pulled out too far or during pivoting into the operating position not to be caught on further components of the baler, the tying yarn is guided additionally on rotation or pivot points of the adjusting device.

Moreover, with appropriate constructive configuration for maximum swivel travel of the vehicle axles of the baler as well as for maximum steer angle of the wheels for a possibly present steering axle, a problem-free movement of the storage containers into the loading position is enabled in order to avoid undesirable collisions and the resulting damages on the baler.

After reaching the loading and servicing position, the loading level of the storage container, i.e., the level of the uppermost termination of the container relative to the ground surface, should be maximally in a range of 1.3 m to 2.3 m. As an advantageous level or height, however, a value of 1.5 to 1.9 m has been found suitable because, at this height, insertion as well as and tying in particular of the uppermost yarn roll is enabled for sure. Each yarn compartment can be accessed without any auxiliary means, for example, an additional step or a risky handling procedure, for example, climbing on the wheels of the baler, so that the user can easily access the storage container while firmly standing on the ground for unloading or restocking the containers.

Moreover, positional sensors of the storage containers are provided that, in combination with safety circuits of the baler control unit avoid faulty operation of the baler and the risks and damages that may be caused thereby.

With the baler embodiment according to the invention, with minimal technical expenditure a safe and simple loading (restocking) of the containers with tying yarn as well as problem-free access to the machine components behind the container are enabled.

Even though explained with respect to the embodiment of a square baler, the features of the invention as described can also be applied to round balers and also storage containers for winding film, for example, in connection with roto balers.

Accordingly, in accordance with the object of the present invention, a baler is provided which is distinguished by a storage container for tying or winding material rolls that enables an easy and quick exchange of the tying or winding material rolls without auxiliary means or accident-prone handling procedures.

DESCRIPTION OF THE PREFERRED EMBODIMENTS

Figure 1:
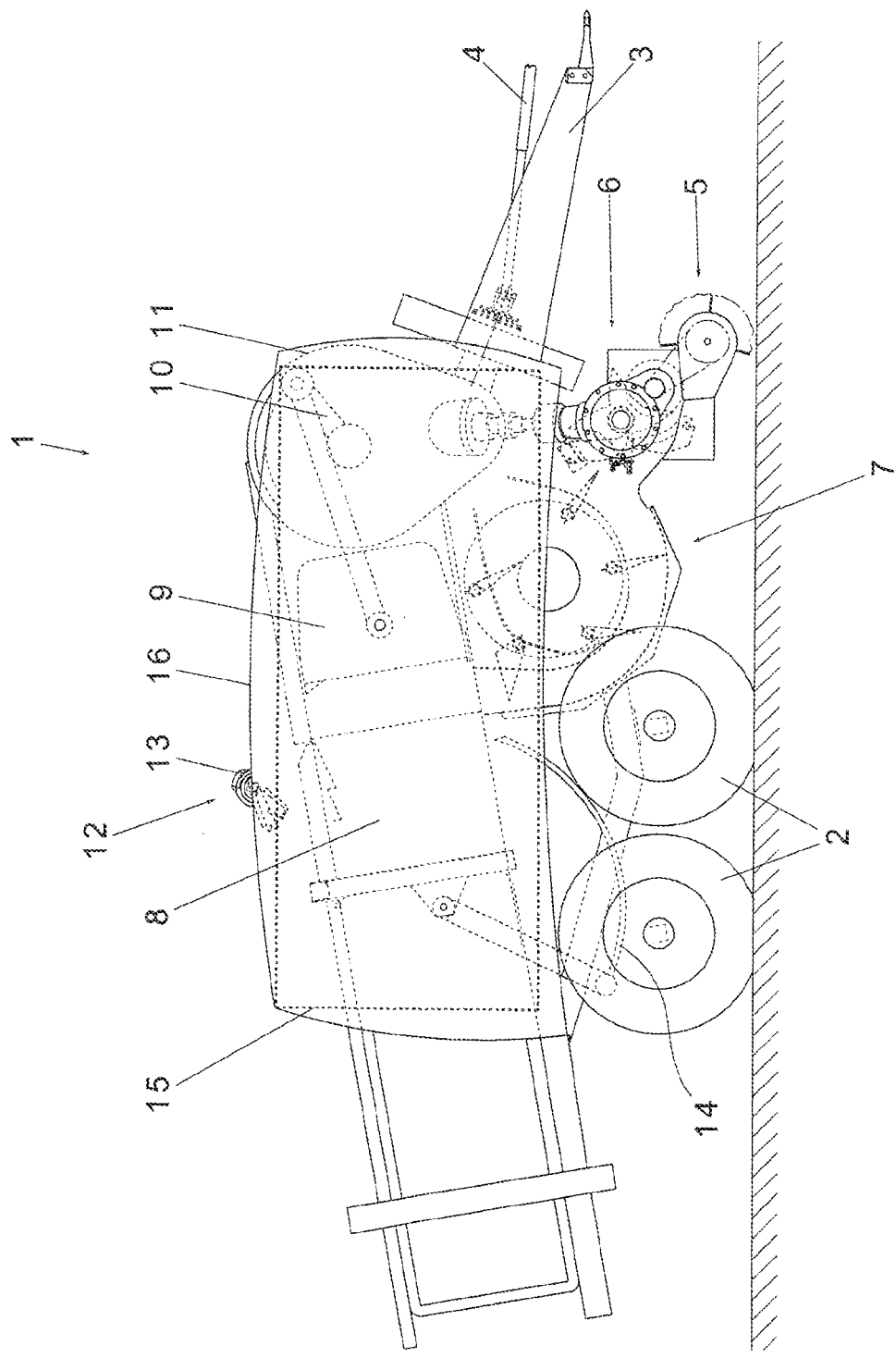
FIG. 1 is a schematic illustration of a large baler in a side view.

FIG. 1 shows an agricultural large baler 1 for producing square bales of agricultural harvested goods. The baler 1 is supported on the ground by wheels 2 and is pulled by means of a hitch 3 by an agricultural farming tractor or similar tractor vehicle and is driven by means of power take-off shaft 4. The baler 1 has at its leading end a pickup device 5 for collecting the harvested goods from the ground. Downstream there are provided a cutting device 6 and a conveying device 7 that transports the harvested and processed goods to a pressing channel 8. In the pressing channel 8 a pressing piston (plunger) 9 is arranged so as to reciprocate. The piston or plunger 9 is driven by a crank drive 10 of the main gear box 11 so as to compress the harvested material that has been transported by the conveying device 7 into the pressing channel 8. Above the pressing channel 8 there is a tying device 12 comprised of a row of adjacently positioned knotters 13. The knotters 13 are supported on a common knotter shaft that is horizontally arranged and oriented transverse to the length of the pressing channel 8. By means of the knotter shaft the knotters 13 are driven together. Below the pressing channel 8 each of the knotters 13 has a needle 14 associated therewith that serves for supplying the tying yarn at the start of the tying process to the knotters 13. The tying yarn for tying the bale is stored in storage containers 15 that are positioned laterally to the baler 1 together with a protective cover 16 that is pivotably connected to the storage container 15. The cover 16 covers, on the one hand, the machine components and, on the other hand, protects the interior of the storage containers 15 from dust and dirt so that the yarn supply is not negatively affected.

Figure 2:
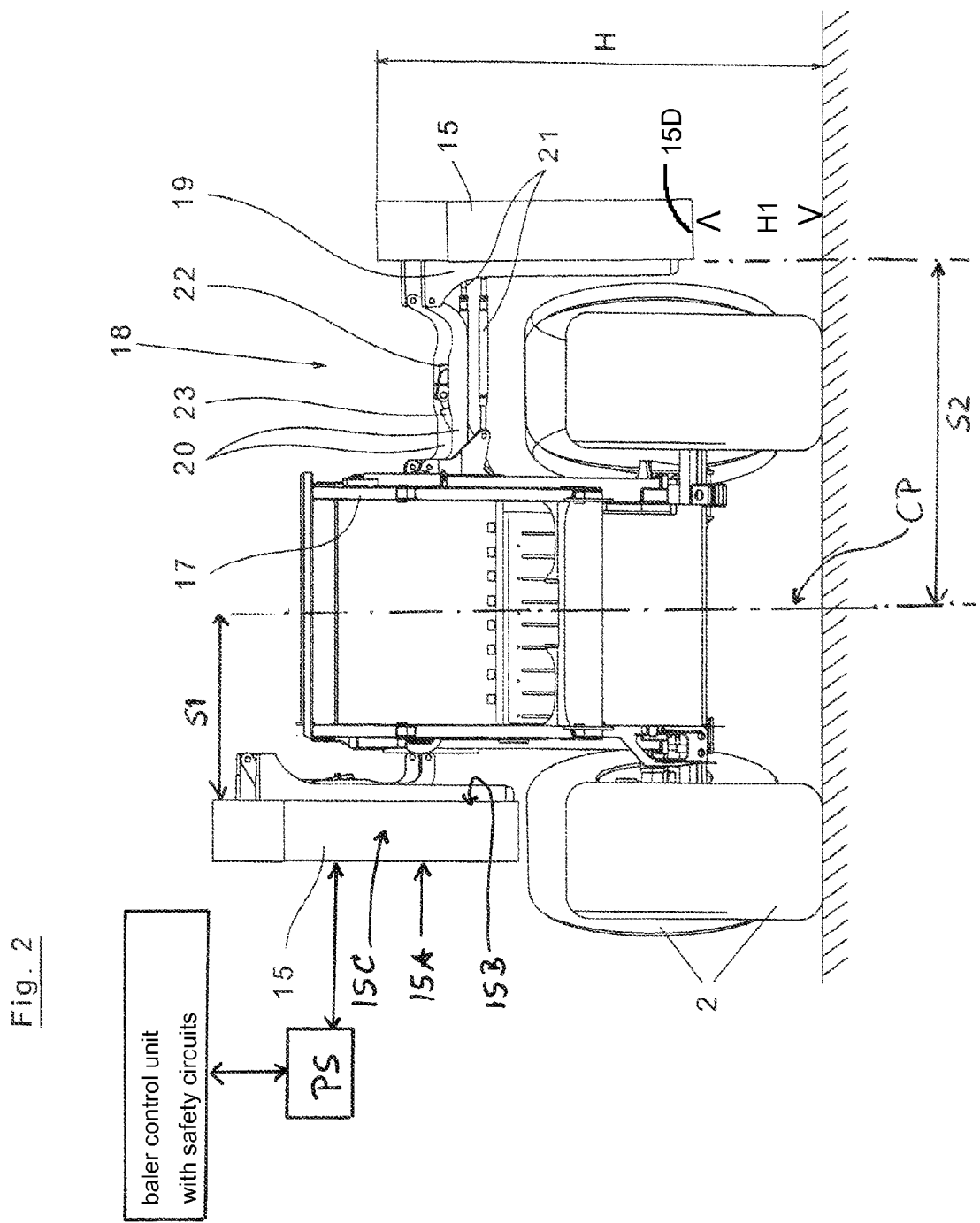
FIG. 2 is a perspective view from the front of the large baler according to the invention wherein, for improved illustration of the components relevant to the instant invention, machine covers and shrouds and other machine components that are not relevant to the invention have been removed.

A possible embodiment of the movable storage containers 15 according to the invention for a baler 1 are illustrated in FIG. 2 in a perspective front view. For clarity of the illustration, the machine covers/shrouds and machine components that are not relevant to the invention are removed in the illustrated view. In particular, the storage containers 15 are shown to the left in the operating position and to the right in the loading position. In this connection, on the main frame 17 of the baler 1 laterally a hydraulically driven adjusting device or actuator 18 is correlated with each storage container 15. The storage container has a front side 15A, a rear side 15B, a bottom end 15D, and interior 15C. The actuator 18 moves the storage container 15 including the protective cover 16 (not illustrated in FIG. 2) by a pivot movement into the loading and servicing position. The actuator 18 is connected by a frame part 19 to the rear side 15B of the storage container 15; the frame part 19 provides additionally a reinforcement for the storage container 15.

The basic configuration of the hydraulic adjusting device 18 of the embodiment illustrated in FIG. 2 comprises two upper (20) and two lower (21) pivotably supported extension arms 20/21, which together form a parallelogram, and a transverse linkage 22 that connects the upper arms 20. The transverse linkage 22 is engaged by hydraulic cylinder 23. When the hydraulic cylinder 23 is actuated (beginning with the position shown to the left in FIG. 2) the storage container 15 is moved by the extension arms 20/21 on a curved path past the wheels 2 and at the same time moved downwardly to a level or height H that is comfortable for the operator (shown to the right of FIG. 2). The spacing of the storage container 15 and its rear side 15 B to the vertical longitudinal center plane CP of the baler 1 is enlarged (S2) relative to the spacing in the operating position (S1, left side of FIG. 2) and at the same time the spacing (H) to the ground, also the spacing H1 of the bottom end 15D to the ground, is reduced. By actuating the hydraulic cylinder 23 again, the storage container 15 is moved back into the operating position at the main frame 17 of the baler 1 (shown to the left of FIG. 2). Moreover, as schematically illustrated in FIG. 2, positional sensors PS of the storage containers are provided that, in combination with safety circuits of the baler control unit avoid faulty operation of the baler and the risks and damages that may be caused thereby.

Also conceivable, by an appropriate constructive design of the adjusting device 18, is a tilted or slanted loading and servicing position of the storage container 15 in which the container 15 is not vertically positioned but arranged at a slant angle such that in the upper area it projects past the wheels 2.

In all embodiments, a collision of the storage containers with parts of the baler is prevented in all movement phases by a sufficient safety spacing of the storage containers 15 to the baler parts for maximum swivel travel of the vehicle axles as well as for maximum steering angle of the steered wheels 2.

The specification incorporates by reference the entire disclosure of German priority document 10 2010 027 539.5 having a filing date of Jul. 16, 2010.

While specific embodiments of the invention have been shown and described in detail to illustrate the inventive principles, it will be understood that the invention may be embodied otherwise without departing from such principles.

What is claimed is:

1. A baler in the form of a harvesting machine for producing bales of agricultural harvested goods, the baler being supported by wheels on the ground and embodied to be self-propelled or hitched to and driven by a tractor, the baler comprising a pickup device collecting the harvested goods and a conveying device transporting the harvested goods from the pickup device to a pressing channel of the baler where bales are formed from the harvested goods, wherein the bales are tied by a tying material supplied from at least one storage container arranged on the baler, wherein the at least one storage container is moveable from an operating position into a servicing position allowing access to machine components of the baler covered by the at least one storage container when in the operating position, wherein the at least one storage container is moveable into a loading position for inserting or removing rolls of the tying material into the at least one storage container, wherein the loading position and the servicing position are identical and define a common loading and servicing position, wherein the at least one storage container has walls defining an interior of the at least one storage container, wherein the tying material is disposed in the interior, wherein the at least one storage container is upright in the operating position and is upright in the common loading and servicing position, wherein the at least one storage container has a rear side that is facing the baler and a front side facing away from the baler and further has a bottom end, and wherein in the common loading and servicing position the rear side of the at least one storage container has, in comparison to the operating position, a greater spacing relative to a longitudinal center plane of the baler and the bottom end, in comparison to the operating position, has a reduced spacing relative to the ground on which the baler is supported by the wheels.

2. The baler according to claim 1, wherein the at least one storage container in the common loading and servicing position, in a view from above, is at least mostly outside of a projection area of the wheels.

3. The baler according to claim 1, wherein the at least one storage container is moved in a single path movement from the operating position into the common loading and servicing position and from the common loading and servicing position into the operating position.

4. The baler according to claim 1, wherein the at least one storage container is moved in at least two independent movements from the operating position into the common loading and servicing position and from the common loading and servicing position into the operating position.

5. The baler according to claim 1, wherein the at least one storage container is moved by means of muscle power, supported by a force storage device and/or compensation weights, from the operating position into the common loading and servicing position and from the common loading and servicing position into the operating position.

6. The baler according to claim 1, comprising an actuator, wherein at least a part of the movement from the operating position into the common loading and servicing position and from the common loading and servicing position into the operating position is effected by the actuator.

7. The baler according to claim 1, comprising an actuator, wherein the entire movement from the operating position into the common loading and servicing position and from the common loading and servicing position into the operating position is effected by the actuator.

8. The baler according to claim 7, wherein the actuator is a hydraulic actuator.

9. The baler according to claim 7, wherein the actuator is an electric actuator.

10. The baler according to claim 7, wherein the actuator is a hydraulic and electric actuator.

11. The baler according to claim 1, wherein the spacing relative to the ground of an uppermost termination of the at least one storage container in the common loading and servicing position is within a range of 1.3 m to 2.3 m.

12. The baler according to claim 11, wherein the spacing of the uppermost termination of the at least one storage container in the common loading and servicing position is within a range of 1.5 m to 1.9 m.

13. The baler according to claim 1, comprising a baler control unit with safety circuits and position sensors connected to the at least one storage container, wherein a faulty operation of the baler and risks and damages associated with the faulty operation are prevented by the safety circuits in combination with the position sensors.

* * * * *